(12) United States Patent
Daniels (10) Patent No.: US 6,417,840 B1
(45) Date of Patent: Jul. 9, 2002

(54) INTEGRATED CORDLESS MOUSE AND LASER POINTER

(75) Inventor: Ted Daniels, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/317,841

(22) Filed: May 25, 1999

(51) Int. Cl.⁷ ............................ G06F 3/033; G09G 5/08
(52) U.S. Cl. ........................................ 345/158; 345/163
(58) Field of Search ................................ 345/157, 158, 345/163, 166, 169, 183, 182, 180, 179

(56) References Cited

U.S. PATENT DOCUMENTS

| | | | | |
|---|---|---|---|---|
| 4,754,268 A | * | 6/1988 | Mori .......................... | 345/163 |
| 5,049,863 A | * | 9/1991 | Oka ........................... | 345/163 |
| 5,554,980 A | * | 9/1996 | Hashimoto et al. .... | 340/825.72 |
| 5,764,224 A | * | 6/1998 | Lilja et al. ................ | 345/179 |
| 5,774,114 A | * | 6/1998 | Suzuki ....................... | 345/157 |
| 5,781,229 A | * | 7/1998 | Zediker et al. ............ | 348/51 |
| 5,854,621 A | * | 12/1998 | Junod et al. ............... | 345/158 |
| 5,926,168 A | * | 7/1999 | Fan ............................ | 345/158 |
| 5,949,403 A | * | 9/1999 | Umeda et al. ............. | 345/157 |
| 5,999,167 A | * | 12/1999 | Marsh et al. .............. | 345/158 |
| 6,072,468 A | * | 6/2000 | Hocker et al. ............. | 345/157 |
| 6,119,944 A | * | 9/2000 | Mulla et al. ............. | 235/472.03 |
| 6,133,907 A | * | 10/2000 | Liu ............................ | 345/183 |
| 6,137,476 A | * | 10/2000 | Hocker et al. ............. | 345/163 |
| 6,239,389 B1 | * | 5/2001 | Allen et al. .............. | 178/18.01 |

* cited by examiner

*Primary Examiner*—Richard Hjerpe
*Assistant Examiner*—Kevin M. Nguyen
(74) *Attorney, Agent, or Firm*—Perkins Coie LLP (57) ABSTRACT

A communication device capable of selectively communicating control signals to a computer and transmitting a narrow beam of light. A cordless communication device is provided having operational buttons and a port. The communication device may function as a computer mouse, a trackball apparatus, or a touch pad apparatus. Operational signals are generated by a signal generator in response to activation of the operational buttons or movement of a mouse ball. The communication device further includes a light generating apparatus in communication with the port which generates the narrow beam of light. A selectively operable switch is provided for selectively transmitting the operational signals or the beam of light. The communication device includes an independent power supply as well as a power level monitor and switching apparatus. Preferably, the beam of light is a laser beam or other focused beam of light.

40 Claims, 7 Drawing Sheets

INTEGRATED CORDLESS MOUSE AND LASER POINTER

FIELD OF THE INVENTION

The present invention relates to a communication device. More particularly, the present invention relates to a cordless mouse which selectively communicates with a computer and which is also capable of transmitting a beam of laser light.

BACKGROUND OF THE INVENTION

Computerized presentations are an effective method of presenting information in an informative and polished manner. A disadvantage encountered during computerized presentations is that it generally takes two individuals to run the presentation, one to give the presentation and another to operate the computer and associated display which is often a projected display for viewing by an audience. It is possible for a single operator to give the presentation and operate the computer with a cordless mouse. If a cordless mouse is used, however, the presenter must still fumble between the computer mouse and a laser pointer when he wants to point to specific information located on the projected image. Alternatively, when one individual is making the presentation and a cordless mouse is not used, a lag occurs in the presentation as the presenter moves back and forth between controlling the computer and using a laser pointer to illustrate points on the computer controlled projected image.

SUMMARY OF THE INVENTION

The present invention provides a communication device which is selectively operable as a cordless device for sending control signals to a computer and as a transmitter of a laser light beam. The communication device is configured like a conventional cordless input device for a computer and includes a transmission port in a front surface which is adapted to transmit wireless control signals to a computer as well as a beam of light for use in highlighting points of a presentation.

In a preferred embodiment of the invention, the communication device includes a switch for selectively transmitting from the transmission port the wireless control signals or the beam of light. In various aspects of the invention, the communication device may be a cordless mouse, track ball apparatus, or touch pad apparatus, and the beam of light may be a laser beam for use in highlighting a presentation.

The communication device has its own independent power supply, including one or more batteries. In one aspect of the invention, at least one of the batteries powers transmission of the wireless computer control signals and at least one other battery powers transmission of the beam of light. In another aspect of the invention, the communication device includes an automatic switch adapted to switch from one or more batteries which are at low power to one or more other batteries which are at a higher power.

DETAILED DESCRIPTION OF PREFERRED EMBODIMENTS

With reference to FIGS. 1–5, where like numerals designate like elements, there is illustrated a wireless mouse 10 capable of transmitting, for example, infrared control signals to a computer and of transmitting a focused beam of light for presentation highlighting. The mouse 10 has conventional operating buttons 14 and 16 on an upper surface 12. The mouse 10 further has a mouse ball 26 in an undersurface 18, a front surface 20, and a plurality of sides 22. The left and right operating buttons 14, 16 are separately operable, and each button 14, 16 sends a specific infrared (IR) wireless signal or signals to a computer or other like device through a port 24 located on the front surface 20.

The mouse 10 is constructed as a cordless mouse and; thus, has its own internal power supply. Specifically, located in the undersurface 18 (FIG. 5) is a battery compartment 28 for housing one more batteries 33 for powering the wireless mouse 10. One or more of the batteries 33 may also be dedicated to power the transmission of the wireless computer control signals from the mouse 10, while one or more other batteries 33 may be dedicated to power the transmission of the beam of light. Alternatively, the batteries in the compartment 28 may be commonly dedicated to power both forms of signal transmission.

Figure 5:
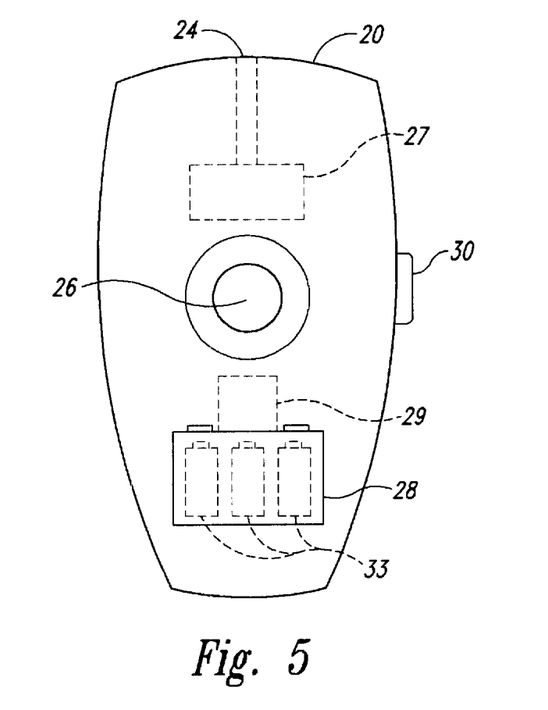
FIG. 5 is a bottom view of the mouse of FIG. 1.

In one preferred battery powering arrangement, shown schematically in FIG. 5, an automatic power tester and switch 29 is connected with the batteries 33 housed within the compartment 28. The tester/switch 29 functions to monitor the power level of the batteries 33 within the compartment 28. If certain of the batteries 33 are dedicated to a particular form of transmission, and the tester/switch 29 determines that one or more of those batteries 33 are at a low power level, the tester/switch 29 is adapted to select one or more other batteries 33 at a higher power level to carry out that particular transmission. The tester/switch 29 is shown schematically in FIG. 11.

Figure 11:
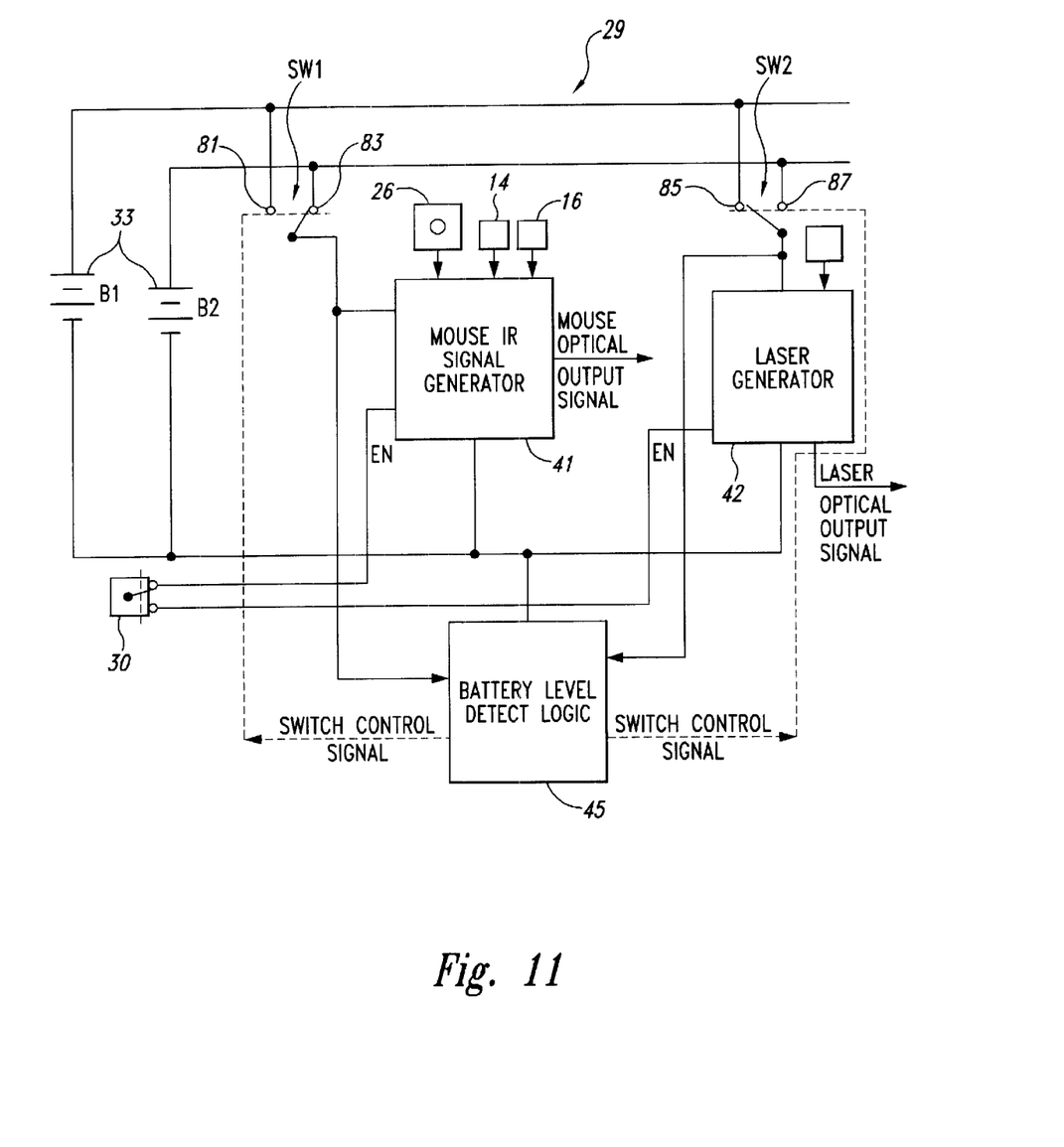
FIG. 11 is a circuit diagram of a power supply of the communication device constructed in accordance with another embodiment of the present invention.

As shown in FIG. 11, a first battery, or set of batteries, 33 is denoted as B1 and a second battery, or set of batteries, 33 is denoted as B2. Both B1 and B2 are connectable to a computer control signal generator 41, a laser generator 42, and a battery level detect logic 45. A switch SW1 is positioned to selectively connect one of B1 and B2 through contacts 81, 83 to the signal generator 41. A switch SW2 is positioned to selectively connect one of B1 and B2 to the laser generator 42 through contacts 85, 87. Normally, SW1 connects battery B1 to the signal generator 41 and SW2 connects battery B2 to the laser generator 42.

As long as the battery level detect logic 45 determines that the voltage level of B1 is greater than or equal to a certain predetermined threshold Th1, B1 is used for powering the signal generator 41 and SW1 keeps the movable contact connected to the fixed contact 83. If the battery level detect logic 45 determines that the voltage level of B1 is less than the threshold Th1, B2 is used for powering the signal generator 41 and SW1 is controlled by the battery level logic detect 45 to move the movable contact to the fixed contact 83. Likewise, if the battery level detect logic 45 determines that the voltage level of B2 is greater than or equal to a certain predetermined threshold Th2, B2 is used for powering the laser generator 42 and SW2 has its movable contact connected to the fixed contact 87. If the battery level detect logic 45 determines that the voltage level of B2 is less than the threshold Th2, B1 is used for powering the laser generator 42 and SW2 is controlled by the battery level detect logic 45 to move the movable contact to the fixed contact 85. The FIG. 11 circuit thus keeps the battery for the signal generator 41 separate from that for the laser generator 42, but automatically allows a battery for one or the other which may fail during use to be switched out of circuit and another battery with a higher voltage level to be switched into circuit, thus allowing a continuation of use of both the computer control function and the laser pointer function.

The signals transmitted by a cordless mouse 10 to the computer are of necessity signals which may be sent without a physical transmission line. Preferably, the mouse 10 sends infrared signals generated by the signal generator 41 in response to movements sensed by the mouse ball 26 and in response to operation of switches controlled by the operating buttons 14, 16. Alternatively, provided a suitable frequency band is used which does not disrupt operation of the computer, the signals from the signal generator 41 may be transmitted as radio frequency signals.

The mouse 10 functions similarly as other cordless mice, i.e., it sends mouse ball 26 signals and switched signals generated by the buttons 14, 16 through the port 24 to a computer or other like device. Advantageously, the mouse 10 further provides the function of transmitting a beam of light. Preferably, the beam of light is a laser beam generated by the laser beam generator 42. Alternatively, the beam of light may be any other focused or narrow beam of light.

Figure 12:
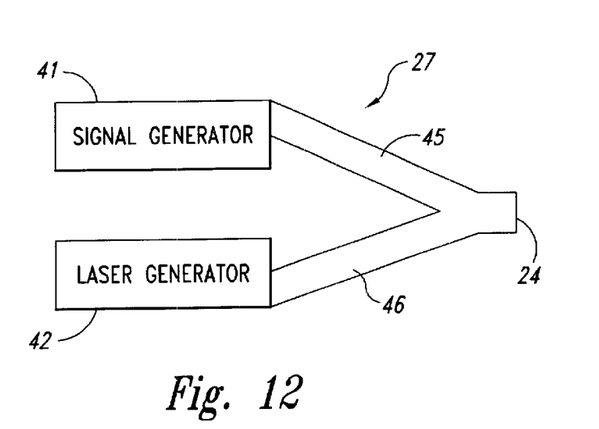
FIG. 12 is a schematic view of pathways for transmitting control signals and beams of light from the communication device in accordance with another embodiment of the present invention.
Figure 13:
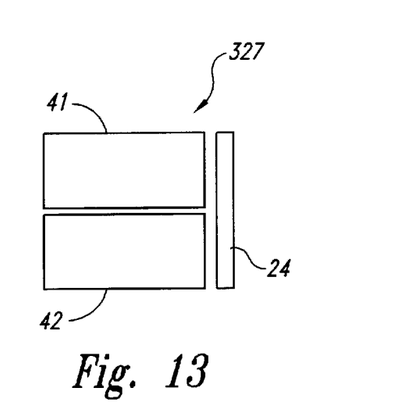
FIG. 13 is another schematic view of pathways for transmitting control signals and beams of light from the communication device in accordance with another embodiment of the present invention.

The function of transmitting the computer control signals and the laser beam will now be described. As shown in FIGS. 5, 12–13, a transmission generating device 27 is shown in communication with the port 24. The transmission generating device 27 is formed of a transmission path which communicates the port 24 with the signal generator 41 and with the laser generator 42, respectively. The transmission path may be formed of a light guide having branches 45, 46 as shown in FIG. 12. Alternatively, as shown in FIG. 13, a transmission generating device 327 may include the signal generator 41 and the laser generator 42 mounted adjacent each other behind the port 24.

Figure 1:
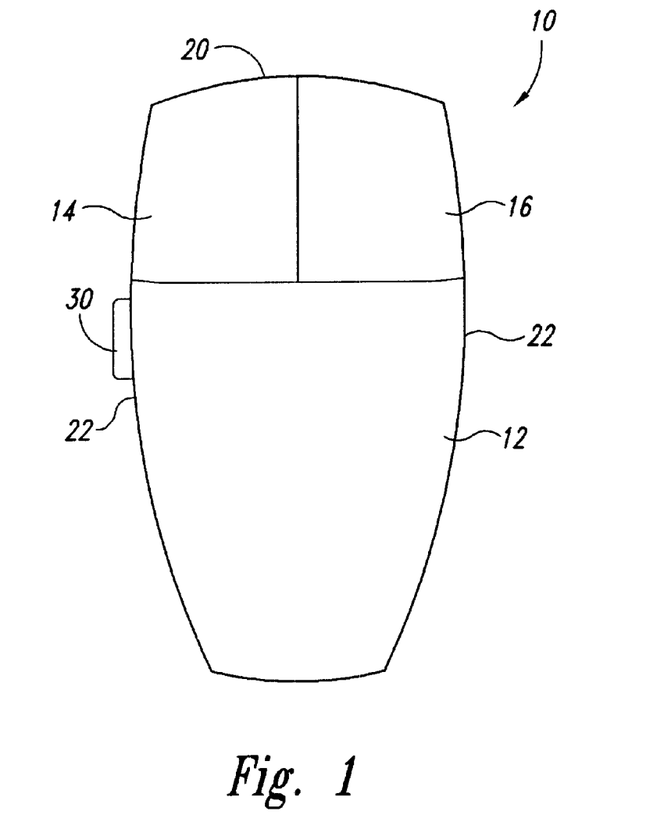
FIG. 1 is a top view of a communication device of the invention constructed as a mouse in accordance with a first embodiment of the present invention.
Figure 2:
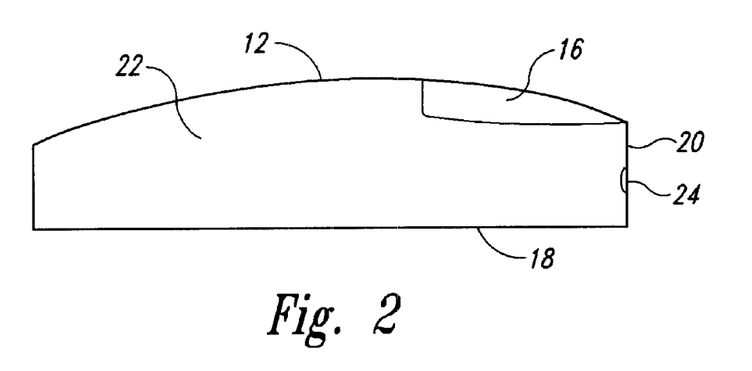
FIG. 2 is a side view of the mouse of FIG. 1.
Figure 3:
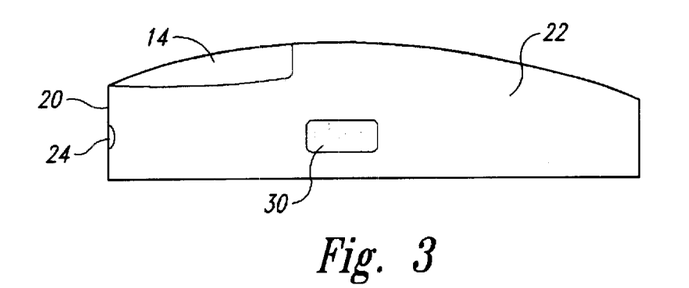
FIG. 3 is another side view of the mouse of FIG. 1.
Figure 4:
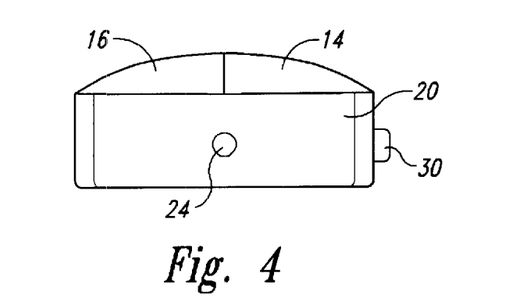
FIG. 4 is a front view of the mouse of FIG. 1.

As illustrated in FIGS. 3, 4, a switch 30 is provided on a side 22 of the cordless mouse 10. While the switch 30 is shown to be on the side 22 to the left of the front surface 20, it is to be understood that the switch may be located anywhere on the mouse 10. The switch 30 functions to selectively allow transmission of the computer control signals produced by either of the buttons 14, 16 and/or the mouse ball 26 or transmission of the beam of light from the light generating apparatus 27 through the port 24. Specifically, with the switch 30 in its normal, undepressed state, the mouse 10 functions as a conventional cordless computer mouse and the signal generator 41 is enabled to transmit signals from the mouse ball 26 and the operating buttons 14, 16 to the computer. Upon depression of the switch 30, the signal generator 41 is disabled. Instead, the laser generator 42 is enabled and a beam of light from the laser generator 42, is transmitted through the port 24. FIG. 11 shows the electrical connection of the switch 30 to enable (EN) inputs of the signal generator 41 and the laser generator 42. As shown, the switch 30 selectively applies an enable signal to one or the other generators 41, 42 in accordance with whether it is depressed or not.

Figure 10A:
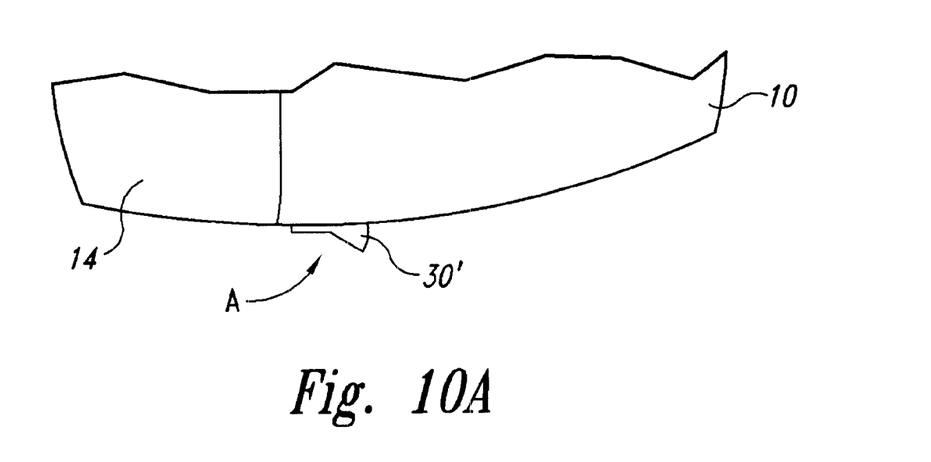
FIG. 10A is a partial top view of a communication device with a control switch in the A position.
Figure 10B:
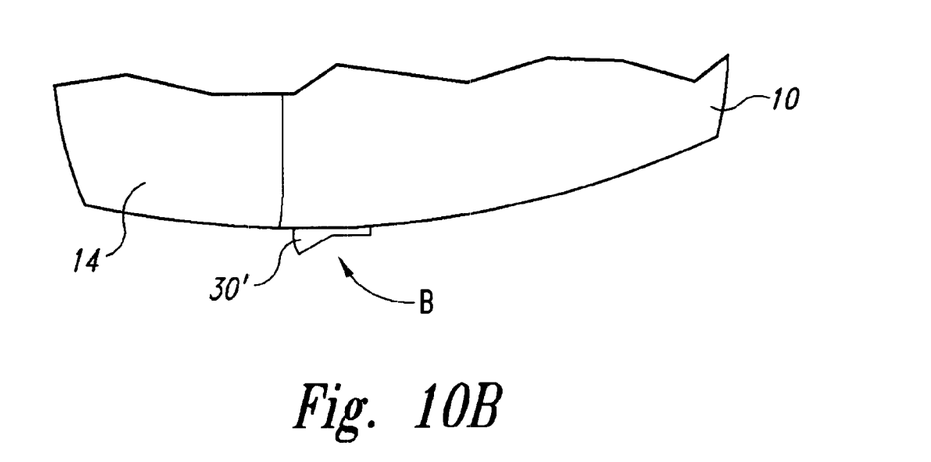
FIG. 10B is a partial top view of a communication device with a control switch in the B position.

Alternatively, as illustrated in FIGS. 10A and 10B, a switch 30' may be a toggle switch. Namely, the switch 30' may be pushed and then mechanically held into an A position, which enables the signal generator 41 or into a B position which enables the laser generator 42.

Figure 6:
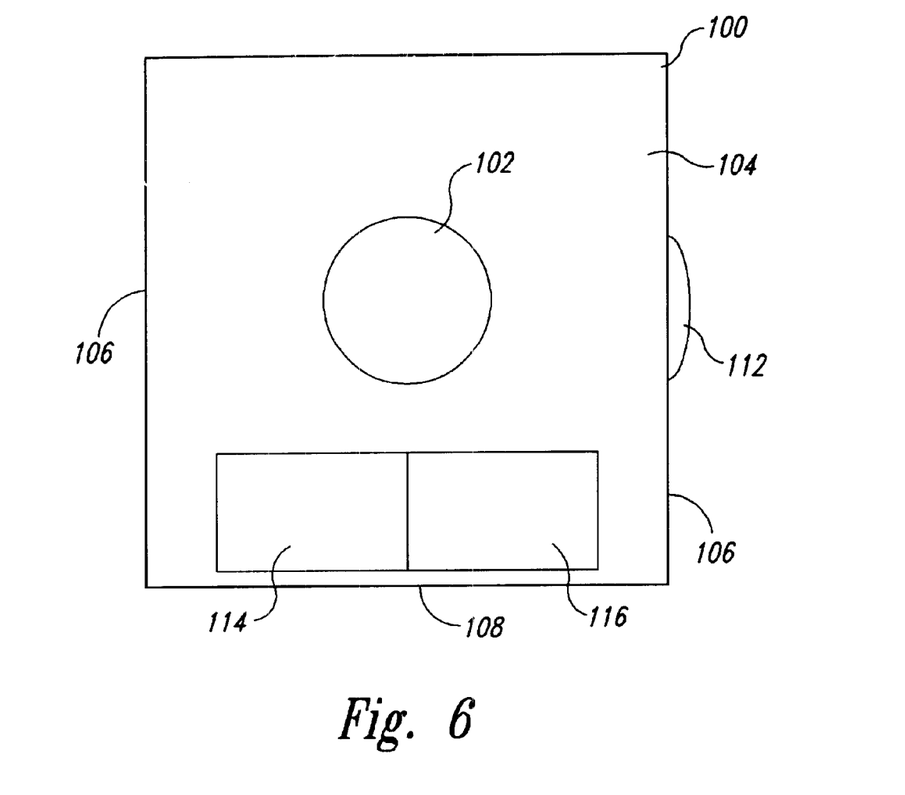
FIG. 6 is a top view of a communication device of the invention constructed as a track ball apparatus in accordance with another embodiment of the present invention.
Figure 7:
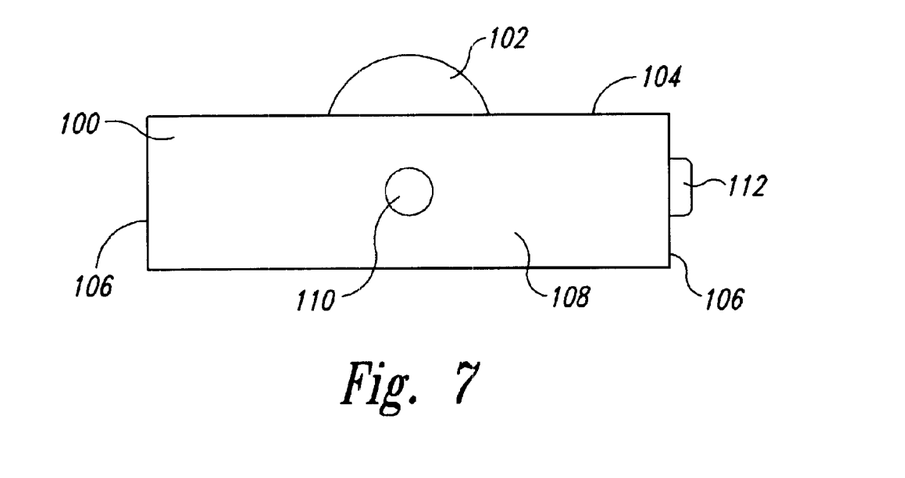
FIG. 7 is a front view of the trackball apparatus of FIG. 6.

The communication device of the invention may also be constructed as a trackball apparatus 100, as illustrated in FIGS. 6–7. The trackball apparatus 100 includes a trackball 102 protruding through an upper surface 104 of a housing. Further, trackball apparatus 100 includes a plurality of sides 106 and a front surface 108. A port 110 is located in the surface 108. A switch 112 is positioned on one of the sides 106. As with the switches 30, 30' on the mouse 10, the switch 112 may be placed anywhere on the trackball apparatus 100. The switch 112 functions similarly to switch 30. The trackball apparatus 100 includes operating switches 114, 116 similar in function to the operating buttons 14, 16 previously described.

Figure 8:
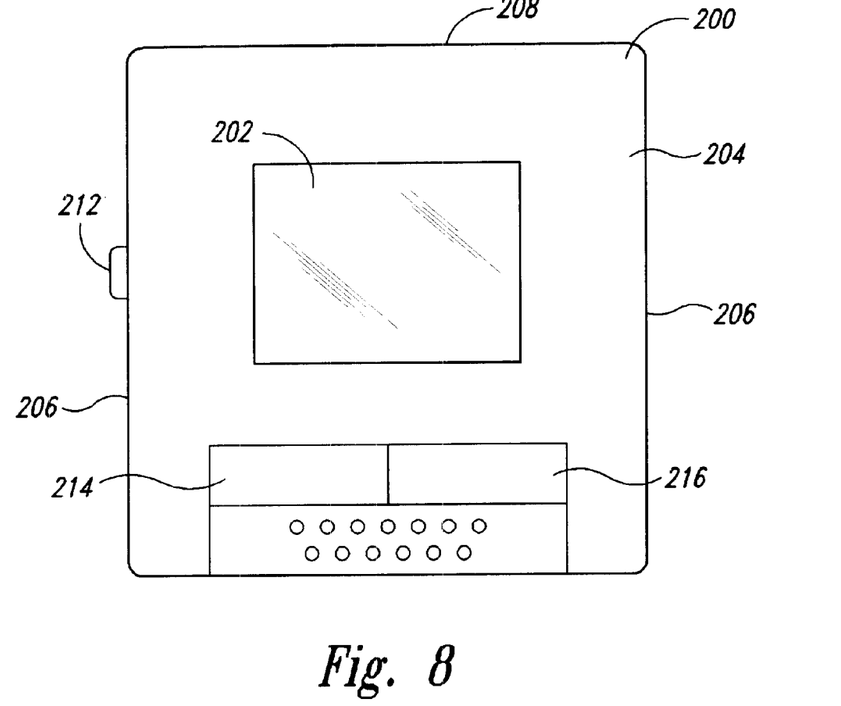
FIG. 8 is a top view of a communication device of the invention constructed as a touch pad apparatus in accordance with another embodiment of the present invention.
Figure 9:
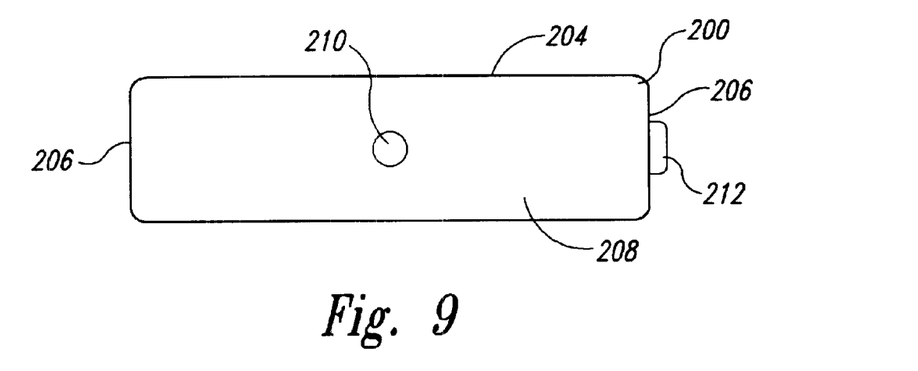
FIG. 9 is a front view of the touch pad apparatus of FIG. 8.

Shown in FIGS. 8, 9 is a touch pad apparatus 200 including a touch pad 202 provided on an upper surface 204. Further, the touch pad apparatus 200 includes a plurality of sides 206 and front surface 208 in which is located a port 210. A switch 212 is provided anywhere on the touch pad apparatus 200 and functions similarly to the previously described switches 30, 30', 112. The touch pad apparatus 200 includes operating switches 214, 216 similar in function to the operating buttons 14, 16 previously described.

Next will be described the mode of operation of the mouse 10 as an example of the use of the communication device of the invention. During business or other types of meetings in which computer images are displayed on the wall or on a screen, it is necessary to be able to control the computer, for example, to switch computer images and to have the ability to point to one or more aspects within each separate computer image. The mouse 10 provides a single operator the opportunity to control a computer using the conventional mouse signals indicating mouse 10 movement and operation of the buttons 14, 16 and thereby control the computer. In addition, the mouse 10 provides the added functionality of enabling a user to point to the computer images with a beam of light. Specifically, an operator may operate the mouse 10 for computer control while standing at a podium, dais, or other location. By aligning the port 24 with a light receiver on the computer, an operator may move the mouse 10 on a surface and/or press one of the operating buttons 14, 16 in order to, for example, switch to the next displayed image. Further, the operator may depress the switch 30 and point the port 24 towards a certain aspect of the computer image being displayed, thereby highlighting that aspect with a beam of light.

Similarly, a single operator may use the trackball apparatus 100 or the touch pad apparatus 200 in much the same way these devices are conventionally used to single handedly change computer images. A user can also use the trackball apparatus 100 or the touch pad apparatus 200 to highlight and point out certain aspects of the computer images with a focused light beam upon operation of the switch 30.

If the battery level detect logic 45 determines that one of the batteries (or set of batteries) 33 denoted as B1 and B2 in FIG. 11 has a voltage level below a certain predetermined threshold, certain switches can be opened and closed to power the signal generator 41 or the laser generator 42 with a different battery or set of batteries 33. For example, presuming that B1 is dedicated to powering the signal generator 41, and the detect logic 45 has determined that the voltage level of B1 is below the threshold level, the battery B2 is used for powering the signal generator 41 and SW1 is controlled by the battery level logic detect 45 to move the movable contact to the fixed contact 83. A like operation is performed with respect to the battery B2 which powers the laser generator 42.

Figure 14:
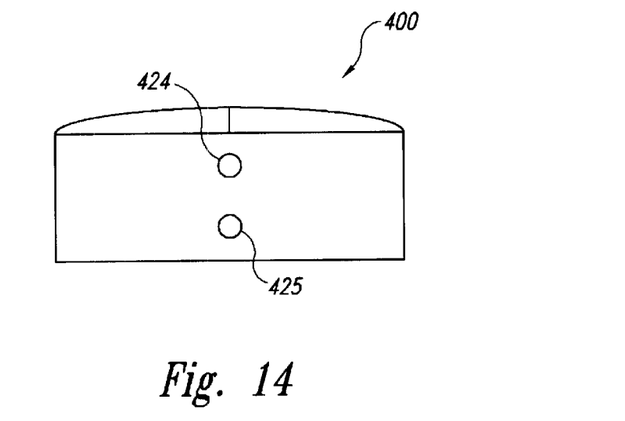
FIG. 14 is a front view of a communication device constructed in accordance with another embodiment of the present invention.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, while the mouse 10 is shown having two operating buttons 14, 16, it is to be understood that a mouse with fewer or more operating buttons is within the scope of this invention. Further, although three batteries 33 are shown in FIG. 5, it is to be understood that any number of batteries 33 may be utilized in the mouse 10, track ball apparatus 100 or touch pad apparatus 200. Additionally, although the communication devices 10, 100, 200 have been described as having a single, multipurpose port 24, the invention is not so limited. As shown in FIG. 14, a communication device 400 includes a pair of ports 424, 425, each port being respectively dedicated to one of the signal generator 41 and the laser generator 42. Accordingly, the invention is not to be seen as limited by the foregoing description, but is only limited by the scope of the appended claims.

What is claimed as new and desired to be protected by Letters Patent of the United States is:

1. A computer communication device, comprising:
    a communicating mechanism having a light transmission port;
    a signal generator configured to transmit operational and motion signals through the transmission port to control a computer;
    a light beam generator configured to transmit a narrow beam of light at a frequency different than a frequency of the operational and motion signals through the same transmission port to form a visible image on a reflective surface; and
    a transmission device operatively coupled among the signal generator, the light beam generator, and the transmission port, the transmission device having a first branch to transmit operational signals from the signal generator to the transmission port, the transmission device further having a second branch to transmit light from the light beam generator to the transmission port.

2. The device of claim 1, further comprising a selectively operable switch for selectively transmitting one of (a) said operational signals to the computer and (b) said narrow beam of light.

3. The device of claim 1 wherein the light beam generator is configured to generate a laser beam.

4. The device of claim 1 wherein the communicating mechanism includes a computer mouse ball.

5. The device of claim 1 wherein the communicating mechanism includes a computer track ball apparatus.

6. The device of claim 1 wherein the communicating mechanism includes a computer touch pad apparatus.

7. The device of claim 1 wherein the signal generator is configured to transmit infrared signals which pass through the port.

8. The device of claim 1, wherein said communicating mechanism is cordless and has an independent power supply.

9. The device of claim 8 wherein the independent power supply includes one or more batteries.

10. The device of claim 9, further comprising a single battery powering the signal generator and the light beam generator.

11. The device of claim 9, further comprising at least two batteries, at least one battery powering the signal generator and at least another battery powering the light beam generator.

12. The device of claim 11, further comprising a plurality of batteries powering the signal generator and another plurality of batteries powering the light beam generator.

13. The device of claim 11, wherein said communicating mechanism further comprises a battery monitoring and switching circuit which automatically switches at least one of a circuit producing said operational signals and a circuit producing said beam of light from one or more batteries which are at a voltage level below a predetermined value to one or more batteries which are at a higher voltage level than said predetermined value.

14. The device of claim 2, wherein said communicating mechanism has a plurality of sides and a front surface, said port being located on said front surface and said switch being located on one of said sides.

15. The device of claim 2 wherein the switch is a momentary depression switch.

16. The device of claim 2 wherein the switch is a toggle switch.

17. The device of claim 10 wherein the transmission device includes a light pipe connecting the signal generator and the light beam generator with the port.

18. A computer communication device, comprising:
    a communicating mechanism having at least one light transmission port;
    a signal generator for transmitting operational signals through one of the at least one transmission ports to control a computer;
    a light beam generator configured to transmit a narrow beam of light through one of the at least one transmission ports to form a visible image on a reflective surface;
    a selectively operable switch for selectively transmitting (a) the operational signals to the computer and (b) the light beam;
    a first battery circuit coupled to the signal generator to power the signal generator, and a second battery circuit coupled to the light beam generator to power the light beam generator; and a battery monitoring and switching circuit coupled to the first and second battery circuits and configured to automatically switch a connection to the light beam generator or the signal generator from one of the first and second battery circuits to the other of the first and second battery circuits when a voltage level of the one battery circuit falls below a predetermined value.

19. The device of claim 18, wherein said communicating mechanism is cordless and has an independent power supply.

20. The device of claim 19, wherein said independent power supply comprises one or more batteries.

21. The device of claim 18, further comprising at least two batteries, at least one battery powering the signal generator and at least another battery powering the light beam generator.

22. The device of claim 21, further comprising a plurality of batteries powering the signal generator and another plurality of batteries powering the light beam generator.

23. The device of claim 18 wherein the communicating mechanism includes a computer mouse ball.

24. The device of claim 18 wherein the communicating mechanism includes a computer track ball apparatus.

25. The device of claim 18 wherein the communicating mechanism includes a computer touch pad apparatus.

26. A method of operating a communication device for selectively communicating with a computer and directing a beam of light, the method comprising:

placing the communication device in communication with the computer; and alternately transmitting through the same transmission port and in response to activation of a selectively operable switch one of (a) operational signals from an operational signal generator to the computer and (b) a beam of light from a light beam generator to a reflective surface to form a visible image on the reflective surface wherein the operational signals and the beam of light have different frequencies.

27. The method of claim 26 wherein placing the communication device in communication with the computer includes manipulating a computer mouse ball.

28. The method of claim 26 wherein placing the communication device in communication with the computer includes manipulating a computer track ball apparatus.

29. The method of claim 26 wherein placing the communication device in communication with the computer includes manipulating a computer touch pad apparatus.

30. The method of claim 26 wherein transmitting the beam of light includes transmitting a laser beam.

31. The method of claim 26 wherein transmitting the operational signals includes transmitting infrared signals.

32. The method of claim 26 wherein placing the communication device in communication with the computer includes cordlessly communicating with the computer, and wherein the method further includes powering the communication device from an independent power supply.

33. The method of claim 32 wherein powering the communication device with the independent power supply includes powering with one or more batteries.

34. The method of claim 26, further comprising generating computer operational signals and generating the beam of light.

35. The method of claim 34 wherein generating signals includes activating a signal generator and wherein generating the beam of light includes activating a light beam generator.

36. The method of claim 35, further comprising providing power to the signal generator and the light beam generator.

37. The method of claim 35 wherein providing the power includes providing power with at least one battery.

38. The method of claim 36 wherein providing the power includes providing power with at least two batteries, at least one battery powering the signal generator and another battery powering the light beam generator.

39. The method of claim 36 wherein providing the power includes providing power with a plurality of batteries powering the signal generator and another plurality of batteries powering the light beam generator.

40. The device of claim 38, further comprising monitoring the batteries and automatically switching at least one of the signal generator and the light beam generator from one or more batteries which are at a voltage level less than a predetermined value to one or more batteries which are at a voltage level higher than the predetermined value.

* * * * *

UNITED STATES PATENT AND TRADEMARK OFFICE
CERTIFICATE OF CORRECTION

PATENT NO. : 6,417,840 B1
DATED : July 9, 2002
INVENTOR(S) : Daniels

It is certified that error appears in the above-identified patent and that said Letters Patent is hereby corrected as shown below:

Column 2,
Line 43, "and;" should be -- and, --;

Column 8,
Line 27, "35" should be -- 36 --;
Line 37, "device" should be -- method --;

Signed and Sealed this

Fifth Day of August, 2003

JAMES E. ROGAN
*Director of the United States Patent and Trademark Office*